United States Patent Office 3,317,603
Patented May 2, 1967

3,317,603
IMPROVEMENT IN THE PREPARATION OF
N-VINYL-N-METHYLACETAMIDE
Robert B. Blance, East Longmeadow, and Saul M. Cohen, Springfield, Mass., assignors, by mesne assignments, to Monsanto Company, a corporation of Delaware
No Drawing. Filed Sept. 27, 1963, Ser. No. 312,015
2 Claims. (Cl. 260—561)

The present invention relates to an improved method for the preparation of N-vinyl-N-methylacetamide; more particularly, it relates to the adaptation and improvement of a method used heretofore to prepare N-alkyl-N(1-alkenyl)-acetamides by the addition of acetic anhydride to N-alkylaldimines and the subsequent splitting off of acetic acid.

N-vinyl-N-methylacetamide is a known compound that can be polymerized, under appropriate conditions, to larger molecules possessing rather interesting chemical and physical properties, as disclosed in copending application S.N. 302,481, filed Aug. 15, 1963. So far, however, these useful polymers have not been available on a practical basis to those engaged in the art partly because of the difficulties attendant to the methods heretofore available for the production of the monomer. The existing methods for the preparation of N-vinyl-N-methylacetamide are not satisfactory either in terms of yield or of purity of product. The preparation of the monomer by pyrolysis of N-(beta-acetoxyethyl)methylacetamide, for instance, is notorious for low yields of impure material. The vinylation of N-methylacetamide with acetylene occurs at best in yields of about 30%. In these conditions, it is not surprising therefore that the polymerization of N-vinyl-N-methylacetamide has led, when attempted at all, to materials of little value in that they generally consist of dark oils of undefined properties.

N-vinyl-N-propylacetamide has been prepared by a method which consists in forming a Schiff base by the condensation of acetaldehyde and n-propylamine and allowing the Schiff base, N-ethylidenepropylamine, to react with acetic anhydride to form an acetoxy derivative from which acetic acid is split in the presence of triethylamine to yield the vinyl monomer. The best yields achieved by these reactions are 78% for the condensation and 68% for the combined acetylation and deactylation respectively, an overall yield of 53%. The method has been used with slightly lower effectiveness for the N(1-propenyl) and the N(1-butenyl) homologs of the N-vinyl compound. In the case of N-vinyl-N-methylacetamide however, the method fails surprisingly to provide the compound in any yield and purity approaching those of the higher homologs just mentioned.

It is therefore an object of this invention to provide a method by which N-vinyl-N-methylacetamide can be produced in high yield and high purity. It is also an object to provide N-vinyl-N-methylacetamide of monomer grade which can undergo polymerization to solid high molecular weight products.

These and other objects which will become apparent in the course of this disclosure have been accomplished by allowing acetaldehyde and methylamine to react to form a mixture of N-ethylidenemethylamine, a Schiff base, with a substantial quantity of cyclic trimer. The trimer is then broken down to the Schiff base by slow distillation through a fractional distillation column. The reactions involved so far may be represented as follows:

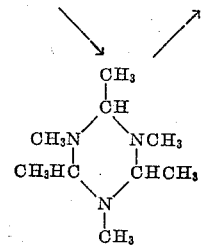

The Schiff base is allowed to react with acetic anhydride in the presence of triethylamine. The mixture is refluxed and extracted with aqueous potassium carbonate. Pure N-vinyl-N-methylacetamide is then obtained by fractional distillation. This part of the process is summarized by the following reactions:

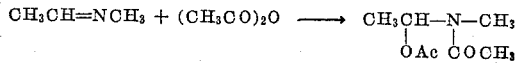

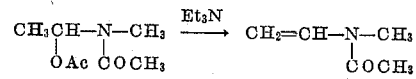

The excellent yields of N-vinyl-N-methylacetamide that are obtained by this improved process can be ascribed in part to the identification and consequent treatment of the acetaldehyde-methylamine trimer, a stage believed to be peculiar to the preparation of N-vinyl-N-methylacetamide, and to the potassium carbonate washing of the final reaction mixture of Schiff base, acetic anhydride and triethylamine, a step which enhances the stability of any N-alkyl-N-(1-alkenyl)-acetamide that is being produced.

The invention is further illustrated by not limited by the following examples, all parts and percentages given therein being on a weight basis unless otherwise noted.

EXAMPLE 1

*Preparation of N-ethylidenemethylamine*

Methylamine (75 g., 2.4 moles) was placed in a three-neck flask equipped with a stirrer, Dry-Ice condenser and dropping funnel. The flask was immersed in a Dry-Ice bath. Acetaldehyde (106 g., 2.4 moles) was added dropwise to the stirred reaction mixture. The mixture became very viscous half way through the addition and toluene (150 ml.) was mixed in to facilitate stirring. When the acetaldehyde addition had been completed, the reaction mixture was allowed to warm to −15° C. Potassium hydroxide (50 g.) was added and the mixture was stirred until the hydroxide had dissolved. The aqueous phase was separated (91 g.) and the remaining organic layer was stirred for two hours with potassium hydroxide (50 g.). The organic phase was then decanted into a distilling flask and distillation was effected at atmospheric pressure through a ten-plate Oldershaw column. The following fractions were collected:

TABLE I.—DISTILLATION OF N-ETHYLIDENEMETHYLAMINE

| Fraction | Weight (g.) | Stillhead Temp. (° C.) | Fraction Composition (percent wt.) | | | Yield, Percent |
|---|---|---|---|---|---|---|
| | | | MeNH₂ | Toluene | MeN—CHCH₃ | |
| 1 | 30.7 | 30–40 | 11.0 | 2.7 | 86 | 19.3 |
| 2 | 30.0 | 40–50 | | 23 | 77 | 16.9 |
| 3 | 32.5 | 50–70 | | 82 | 18 | 4.3 |
| 4 | 110 | 70–110 | | 97 | | |
| Residue | 67.8 | | | | | |

The composition of the fractions was determined by infrared and vapor phase chromatographic analysis.

The residue was a viscous oil which had no unsaturated carbon-nitrogen band at 1675 cm.$^{-1}$ in its infrared spectrum. It was cracked thermally at 70 to 80° C. and the product was distilled through a ten-plate Oldershaw column surmounted by a stillhead to which were attached a receiving flask immersed in an acetone-Dry Ice bath and a condenser cooled with acetone-Dry Ice. The product distilled slowly at a stillhead temperature of 22–24° C., to yield an additional quantity of 51.3 g. N-ethylidenemethylamine. In this manner the yield was raised by 37.4% to an overall figure of 78%.

EXAMPLE 2

*Preparation of N-ethylidenemethylamine*

The method of preparation of Example 1 was employed, with the omission of toluene. The materials used were methylamine (521 g., 16.8 moles) acetaldehyde (730 g., 16.5 moles) and potassium hydroxide (455 g.). The addition of acetaldehyde was effected initially at —20° C. The removal of water was accomplished in three stages by addition of 200 g., 100 g. and 155 g. of potassium hydroxide respectively. The total weight of water extracted was 295 g., 99% of theory. The organic phase of the reaction mixture was subjected to heat in a process which combined the distillation and thermal cracking steps of the previous example to yield the following fractions:

TABLE II.—DISTILLATION OF ACETALDEHYDE-METHYLAMINE CONDENSATE

| Fraction | Pot Temp. (° C.) | Stillhead Temp. (° C.) | Weight (g.) | MeN=CHCH₃, Yield (Percent) |
|---|---|---|---|---|
| 1 | 55–70 | 5–24 | 57.5 | 3.0 |
| 2 | 70–85 | 24 | 247.2 | 26.3 |
| 3 | 55–60 | 24 | 357.1 | 38.0 |
| 4 | 60–95 | 24 | 198.2 | 21.1 |

A residue weighing 71 g. remained in the distillation flask. The total yield of high purity N-ethylidene methylamine was thus 85.5% of theory to which may be added the 3% of recoverable material obtained in the first fraction (28 g.).

EXAMPLE 3

*Preparation of N-vinyl-N-methylacetamide*

N-Ethylidenemethylamine (769 g., 13.5 moles) and benzene (500 ml.) were added to a five-liter, three-neck flask equipped with stirrer, condenser, dropping funnel and thermometer. The flask was immersed in a cooling bath at —10° C. Triethylamine (1400 g., 13.8 moles) was mixed with acetic anhydride (1380 g., 13.5 moles) and the mixture was added dropwise to the flask at a rate to maintain the temperature below —5° C. The contents of the flask were stirred throughout the period required for the addition. The flask was stored at 0° C. for 2.5 days and then heated to reflux for 5 hours.

A solution of potassium carbonate (1400 ml. 33% K₂CO₃) was placed in a flask and cooled to 0° C. by immersion in an ice bath. The reaction mixture was also cooled to 0° C. and added in a rapid stream to the carbonate solution with stirring for rapid mixing. Stirring was continued for 30 minutes. The aqueous phase was then separated and extracted three times with benzene (600 ml. portions). The benzene extracts were combined with the organic layer and the resulting mixture was extracted with aqueous potassium carbonate (200 ml.). The benzene solution was then dried by stirring for 2 hours with anhydrous potassium carbonate (500 g.). The benzene was removed by distillation under reduced pressure and the remaining product was purified by fractional distillation through a ten-plate Oldershaw column at a pressure of 12 mm. Hg. The following fractions were collected:

TABLE III.—DISTILLATION OF N-VINYL-N-METHYL-ACETAMIDE

| Fraction | Weight (g.) | Boiling point (° C., 12 mm. Hg.) | N-Vinyl-N-methylacetamide | |
|---|---|---|---|---|
| | | | Percent in fraction | Percent yield |
| 1 | 7.5 | 52 | 76 | 0.4 |
| 2 | 931.4 | 52 | 99.3 | 69.1 |
| 3 | 138.4 | 52 | 94.5 | 10.2 |
| 4 | 39.7 | 49–51 | 81 | 2.4 |

The purity of the fractions was determined by vapor phase chromatography. A total yield of 82% N-vinyl-N-methylacetamide was thus produced, a small part of it in impure state but capable of purification by recycling.

EXAMPLE 4

*Polymerization of N-vinyl-N-methylacetamide*

N-Vinyl-N-methylacetamide (450 g.) was added to a one-liter polymerization pot equipped with anchor-blade stirrer, nitrogen inlet, condenser and drying tube. α,α,-Azo-diisobutyronitrile (2.25 g.) was added. The polymerization was run at 50° C. for 30 hours under dry nitrogen. After 17 hours, a solid mass had formed.

The polymer was dissolved in acetone (3 liters) and precipitated from the solution with hexane (16 liters). N-vinyl-N-methylacetamide (28.6 g.) was recovered from the hexane by distillation. The polymer was milled, washed with hexane and dried. The yield was 365 g., corresponding to an 81% conversion of monomer. The inherent viscosity, an indication of molecular weight, was 1.05 in water and 1.08 in methanol.

The process improvement with which this invention is concerned operates at each of the steps of the synthesis of N-vinyl-N-methylacetamide. Part of this improvement, i.e. the heating of the acetaldehyde-methylamine trimer for conversion into N-ethylidenemethylamine, is obviously restricted to the condensation product of these two particular reactants, since such an interfering trimer molecule is not formed when higher amines and aldehydes are used in the preparation of homologs of N-vinyl-N-methylacetamide. The washing of the Schiff base-acetic anhydride-triethylamine mixture products with aqueous potassium carbonate, on the other hand, is of benefit in the preparation of any N-(1-alkenyl)-N-(hydrocarbon substituted)-acetamide from the corresponding Schiff base since the object of this treatment is to obtain a distillate pure enough for subsequent polymerization and at the same time to minimize decomposition of the crude product in the pot.

Finally, it must be pointed out that the benzene and toluene employed in the process are merely examples of inert solvents for the system and that the sodium carbonate functions because it is a mildly alkaline material which can be replaced by any non-solvent material having aqueous solutions in the pH range of about 7.5 to about 10.5, for example other carbonates, phosphates, salts of certain organic acids, and so on.

What is claimed therefore is:

1. In the process for the preparation of N-vinyl-N-methyl-acetamide wherein methylamine and acetaldehyde are reacted to form N-ethylidenemethylamine and a trimeric condensation product of methylamine and acetaldehyde; which products are extracted with an alkaline hydroxide compound, and wherein the N-ethylidenemethylamine is treated further to convert it into N-vinyl-N-methylacetamide; the improvement which comprises fractionally distilling the trimeric condensation product of methylamine and acetaldehyde to convert it into N-ethylidenemethylamine.

2. The process of claim 1 where the heat treatment consists in slow fractional distillation of the trimer at a pot temperature greater than the boiling point of N-ethylidenemethylamine.

References Cited by the Examiner

UNITED STATES PATENTS

| | | | |
|---|---|---|---|
| 1,926,014 | 9/1933 | Rosenmund | 260—561 |
| 2,186,976 | 1/1940 | Junkmann et al. | 260—561 |
| 2,231,905 | 2/1941 | Hanford et al. | 260—561 |
| 2,648,709 | 8/1953 | Sletzinger et al. | 260—561 |
| 3,008,992 | 11/1961 | Lynn et al. | 260—561 |

OTHER REFERENCES

Breederveld Rec. Trav. Chim. des Pays-Bas, vol. 79, pp. 401–407 (1960).

Craig et al., In: Weissberger, Technique of Organic Chemistry, vol. 3, 2nd revised ed., Part I Separation and Purification, pp. 150–151, N.Y., Interscience, 1956.

Kahovec, Zeit, Physikal. Chemie, vol. 43B, pp. 364–374 (1939).

Smolin et al. s-Triazines and Derivatives, pp. 476–478, N.Y. Interscience, 1959.

Triollais Bul. Soc. Chim. France, 5th Series, vol. 14, pp. 708–716 (1947).

WALTER A. MODANCE, *Primary Examiner.*

NATALIE TROUSOF, *Assistant Examiner.*